United States Patent
Lechkun et al.

(10) Patent No.: US 8,894,120 B2
(45) Date of Patent: Nov. 25, 2014

(54) CENTER CONSOLE ADJUSTMENT MECHANISM

(71) Applicant: Ford Global Technologies, LLC, Dearborn, MI (US)

(72) Inventors: David Michael Lechkun, Shelby Township, MI (US); Richard Joseph Wells, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 75 days.

(21) Appl. No.: 13/724,727

(22) Filed: Dec. 21, 2012

(65) Prior Publication Data

US 2014/0175820 A1    Jun. 26, 2014

(51) Int. Cl.
- *B60R 7/04* (2006.01)
- *B60N 3/00* (2006.01)
- *E06B 3/46* (2006.01)

(52) U.S. Cl.
CPC ... *B60N 3/00* (2013.01); *B60R 7/04* (2013.01); *E06B 3/46* (2013.01)
USPC ........................................ 296/24.34; 296/37.8

(58) Field of Classification Search
CPC .............. B60N 2/46; B60N 3/08; B60N 3/10; B60R 7/04; B60R 7/06
USPC ............... 296/24.34, 37.8, 37.15, 1.09, 37.14
See application file for complete search history.

(56) References Cited

U.S. PATENT DOCUMENTS

| | | | |
|---|---|---|---|
| 4,733,901 A * | 3/1988 | Okuyama ................... | 296/37.16 |
| 4,854,632 A * | 8/1989 | Kreuze et al. .............. | 296/37.12 |
| 6,152,522 A * | 11/2000 | Boulay et al. ................. | 296/208 |
| 6,609,631 B2 * | 8/2003 | Asami ............................ | 220/817 |
| 6,932,402 B2 * | 8/2005 | Niwa et al. ................. | 296/24.34 |
| 7,004,527 B2 * | 2/2006 | Niwa et al. ................. | 296/24.34 |
| 7,125,063 B2 * | 10/2006 | Kawamoto et al. .......... | 296/37.8 |
| 7,234,746 B2 * | 6/2007 | Sakakibara et al. ....... | 296/24.34 |
| 7,374,220 B2 * | 5/2008 | Ichimaru ..................... | 296/37.1 |
| 7,641,266 B2 * | 1/2010 | Platto et al. ............. | 296/193.06 |
| 7,658,425 B2 * | 2/2010 | Paxton et al. .............. | 296/24.34 |
| 7,685,901 B2 * | 3/2010 | Leopold et al. ................. | 74/434 |
| 7,794,000 B2 * | 9/2010 | Ichimaru ..................... | 296/24.34 |
| 8,215,688 B2 * | 7/2012 | Hipshier et al. ........... | 296/24.34 |
| 8,376,435 B2 * | 2/2013 | Dexter et al. .............. | 296/24.34 |
| 8,444,196 B2 * | 5/2013 | Arndt et al. ................ | 296/24.34 |
| 8,517,443 B2 * | 8/2013 | Hipshier et al. ........... | 296/24.34 |
| 8,616,605 B2 * | 12/2013 | Hipshier et al. ........... | 296/24.34 |
| 2005/0146150 A1 * | 7/2005 | Niwa et al. ................. | 296/24.34 |

(Continued)

FOREIGN PATENT DOCUMENTS

| | | |
|---|---|---|
| JP | 2267038 A | 10/1990 |
| KR | 19980046544 A | 9/1998 |

*Primary Examiner* — Gregory Blankenship (74) *Attorney, Agent, or Firm* — Frank A. MacKenzie; Brooks Kushman P.C.

(57) ABSTRACT

A vehicle is provided with a center console that extends longitudinally between two rear seats and two front seats and defines a cavity with a receptacle disposed therein. An adjustment mechanism is disposed within a rearward portion of the center console, and a panel is disposed over an intermediate portion of the center console. The panel includes a proximal end that is connected to the adjustment mechanism and a rearward end supported slidably by the center console. The panel is movable in a fore-and-aft direction between a forward position over the receptacle and a rearward position for providing access to the receptacle.

16 Claims, 6 Drawing Sheets

(56) References Cited

U.S. PATENT DOCUMENTS

| | | | |
|---|---|---|---|
| 2005/0248170 A1* | 11/2005 | Kawamoto et al. | 296/24.34 |
| 2006/0012202 A1* | 1/2006 | Sakakibara et al. | 296/24.34 |
| 2008/0035657 A1* | 2/2008 | Yamashita | 220/826 |
| 2009/0146444 A1* | 6/2009 | Ichimaru | 296/37.8 |
| 2010/0090491 A1* | 4/2010 | Hipshier et al. | 296/24.34 |
| 2013/0257247 A1* | 10/2013 | Doll et al. | 312/319.7 |
| 2014/0091589 A1* | 4/2014 | Mather et al. | 296/37.14 |
| 2014/0175820 A1* | 6/2014 | Lechkun et al. | 296/24.34 |

* cited by examiner

CENTER CONSOLE ADJUSTMENT MECHANISM

TECHNICAL FIELD

One or more embodiments relate to a center console within a passenger vehicle and an adjustment mechanism for adjusting a panel of the center console.

BACKGROUND

Conventional vehicles often include a center console mounted in between two front seats. Such a center console is often difficult to access for passengers sitting in a rear seating row. Additionally, such center consoles are typically small and non-insulated. The rear seating row may include a bench seat for accommodating three passengers, or two rear seats. For vehicles having two rear seats, a rear center console may be provided between the two rear seats.

SUMMARY

In one embodiment, a vehicle is provided with a vehicle body having a passenger compartment. A first seating row is oriented in a forward position of the passenger compartment and includes two front seats. Each front seat is laterally spaced apart from the other front seat. A second seating row is oriented in an intermediate position of the passenger compartment and includes two rear seats. Each rear seat is laterally spaced apart from the other rear seat. A center console extends longitudinally between the two rear seats and the two front seats and defines a cavity with a receptacle disposed therein. An adjustment mechanism is disposed within a rearward portion of the center console. A panel is disposed over an intermediate portion of the center console. The panel includes a proximal end that is connected to the adjustment mechanism and a rearward end supported slidably by the center console. The panel is movable in a fore-and-aft direction between a forward position over the receptacle and a rearward position for providing access to the receptacle.

In another embodiment, an adjustment mechanism is provided with a plate that is disposed within a center console. The plate has an arcuate slot formed therein, and an actuator is mounted to the plate. A carriage is coupled to the actuator and is mounted for translation along the arcuate slot. A panel includes a proximal end that is connected to the carriage, and a distal end that is supported slidably by the center console, and movable in a fore-and-aft direction for providing access to contents within the center console.

In yet another embodiment, an adjustment mechanism is provided with a plate having a slot formed therein. An actuator is mounted to the plate, and a carriage is coupled to the actuator and mounted for translation along the slot. A panel includes a proximal end that is releasably connected to the carriage and a distal end that is supported slidably by an upper portion of a center console. The panel is movable in a fore-and-aft direction for providing access to contents within the center console

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
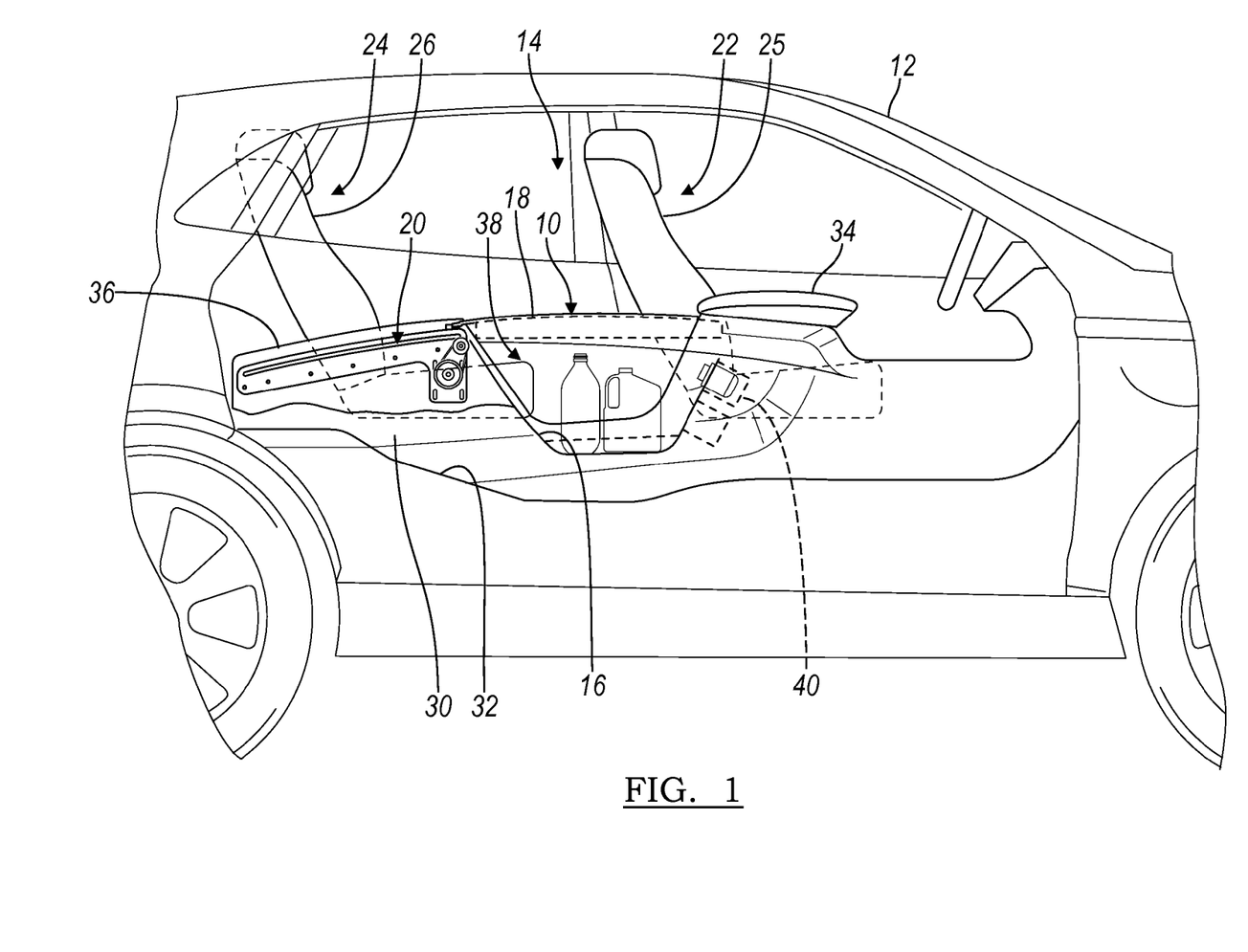
FIG. 1 is a partially fragmented right side view of a passenger vehicle and a center console with an adjustment mechanism according to one or more embodiments.

With reference to FIG. 1, a center console is illustrated in accordance with one or more embodiments and is generally referenced by numeral 10. The center console 10 is disposed within a vehicle 12. The vehicle 12 includes a vehicle body that forms a passenger compartment 14. The center console 10 spans a substantial longitudinal length of the passenger compartment 14, and defines a cavity. The center console 10 includes a receptacle 16 within the cavity, for storing items (e.g., food, beverages, etc.). A panel 18 is disposed over a top portion of the receptacle 16. An adjustment mechanism 20 is mounted within the center console and coupled to the panel 18 for translating the panel in the fore and aft directions for allowing external access to contents within the receptacle 16.

The vehicle 12 includes a first seating row 22 and a second seating row 24. The first seating row 22 is oriented in a forward position of the passenger compartment 14 and the second seating row 24 is oriented in an intermediate position of the passenger compartment 14. The first seating row 22 includes two front seats 25 that are laterally spaced apart from each other. The rear seating row 24 also includes two rear seats 26 that are laterally spaced apart from each other. For brevity, only one front seat 25 and one rear seat 26 are shown in FIG. 1.

The center console 10 extends longitudinally between the two rear seats 26 and the two front seats 25. The center console 10 includes a pair of sidewalls 30 that are laterally spaced apart from each other and extend from a floor 32 within the passenger compartment 14. The center console 10 includes a front arm rest 34 and a rear arm rest 36. The front arm rest 34 extends laterally over a forward portion of the pair of sidewalls 30. The rear arm rest 36 extends laterally over a rearward portion of the pair of sidewalls 30.

The center console 10 substantially encloses the receptacle 16 for maintaining a temperature of the contents stored therein. In the illustrated embodiment, the sidewalls 30 include an opening 38 formed through an intermediate portion of the center console 10. In one or more embodiments, a thermal system (not shown) of the vehicle may be connected to the receptacle 16 for providing heating or cooling. The receptacle 16 is sized for storing large items, such as milk and soft-drink containers. The receptacle 16 also includes compartments 40 that are angled rearward, such that containers stored in the compartments 40 are easily accessible by passengers in the second seating row 24, according to one embodiment.

Figure 2:
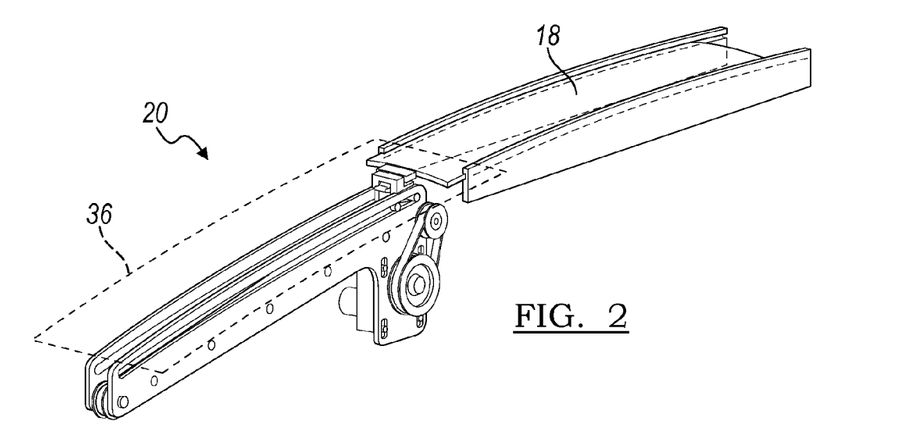
FIG. 2 is a left side perspective view of the adjustment mechanism of FIG. 1, illustrating a panel oriented in a forward position.
Figure 3:
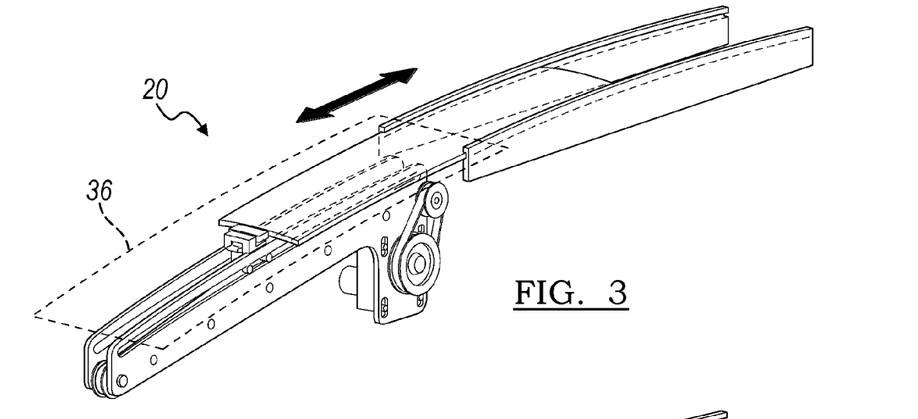
FIG. 3 is another left side perspective view of the adjustment mechanism of FIG. 1, illustrating the panel oriented in an intermediate position.
Figure 4:
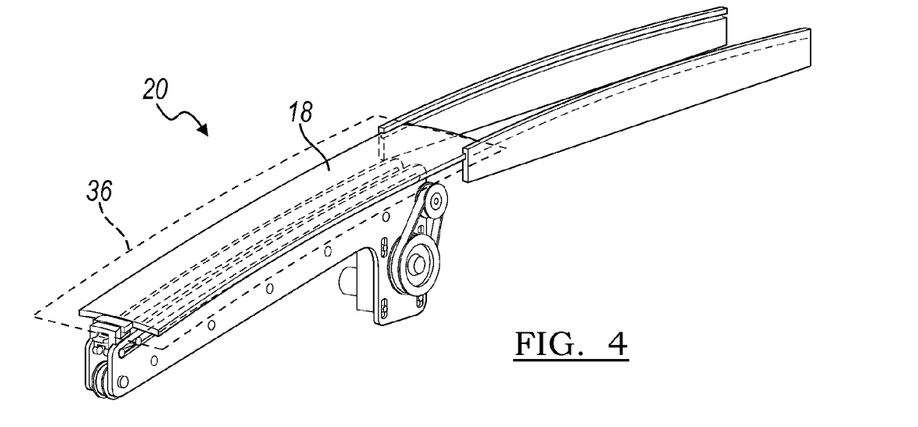
FIG. 4 is yet another left side perspective view of the adjustment mechanism of FIG. 1, illustrating the panel oriented in a rearward position.

Referring to FIGS. 2-4, the adjustment mechanism 20 controls translation of the panel 18 in the fore and aft directions. The adjustment mechanism 20 is mounted within a rearward portion of the center console 10 and underneath the rear arm rest 36. The rear arm rest 36 is illustrated in phantom view in FIGS. 2-4.

FIG. 2, illustrates the panel 18 oriented in a forward position which corresponds to a closed center console 10, as shown in FIG. 1. FIG. 3 illustrates the panel 18 oriented in an intermediate position. The panel 18 translates underneath the rear arm rest 36 as it translates rearward. FIG. 4 illustrates the panel 18 oriented in a rearward position and underneath the rear arm rest 36. Passengers seated in the second seating row 24 can access items stored within the center console 10 when it is oriented in the open position.

Figure 5:
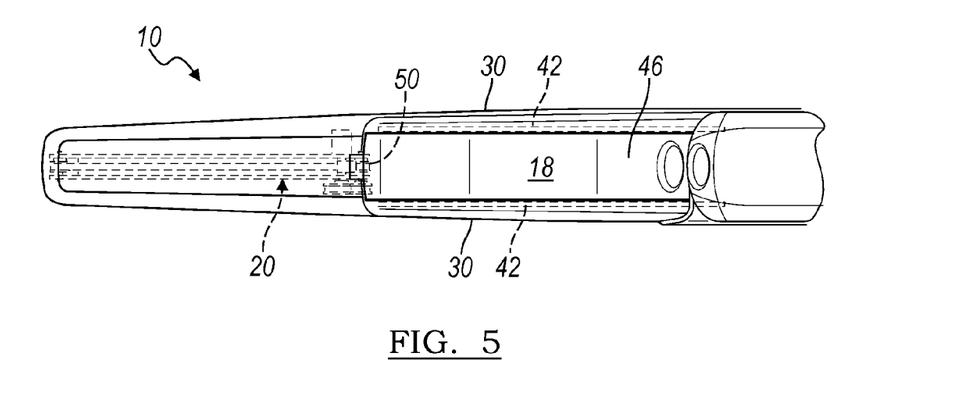
FIG. 5 is a top plan view of the center console and the adjustment mechanism of FIG. 1.
Figure 6:
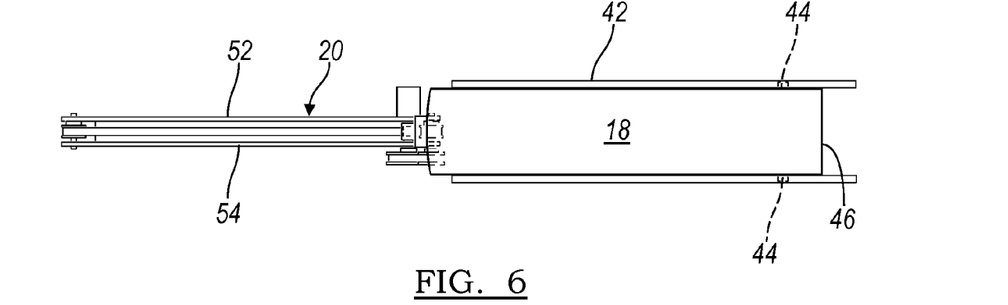
FIG. 6 is a top plan view of the adjustment mechanism of FIG. 5.
Figure 7:
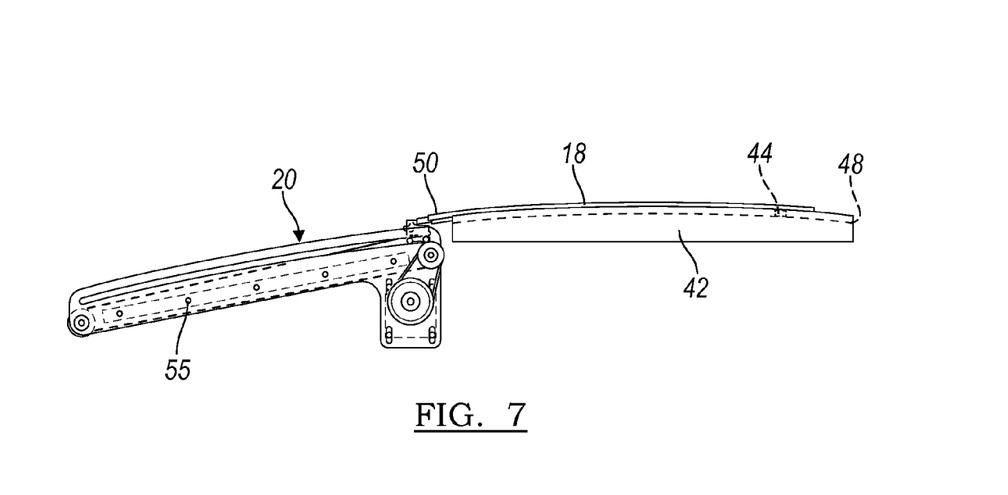
FIG. 7 is a left side view of the adjustment mechanism of FIG. 6, illustrated without a plate.

With reference to FIGS. 5-7, a panel guide 42 extends along an upper intermediate portion of each sidewall 30 and supports the panel 18 as it translates. A pair of projections 44 extend laterally outward from a distal end 46 of the panel 18. A groove 48 is formed into an inner surface of each panel guide 42 for receiving the corresponding projection 44. The adjustment mechanism 20 is connected to a proximal end 50 of the panel 18. The grooves 48 are formed in a non-arcuate shape, according to the illustrated embodiment. In one embodiment, the panel guides 42 include arcuate grooves (not shown). For such an embodiment, the panel 18 may be configured without projections such that the outer lateral edges engage the arcuate grooves.

The adjustment mechanism 20 includes a first plate 52 and a second plate 54 that are laterally spaced apart from each other and mounted within a rear portion of the center console 10. In one embodiment, the adjustment mechanism 20 includes a block 55 that is mounted between the plates 52, 54 for maintaining lateral spacing.

Figure 8:
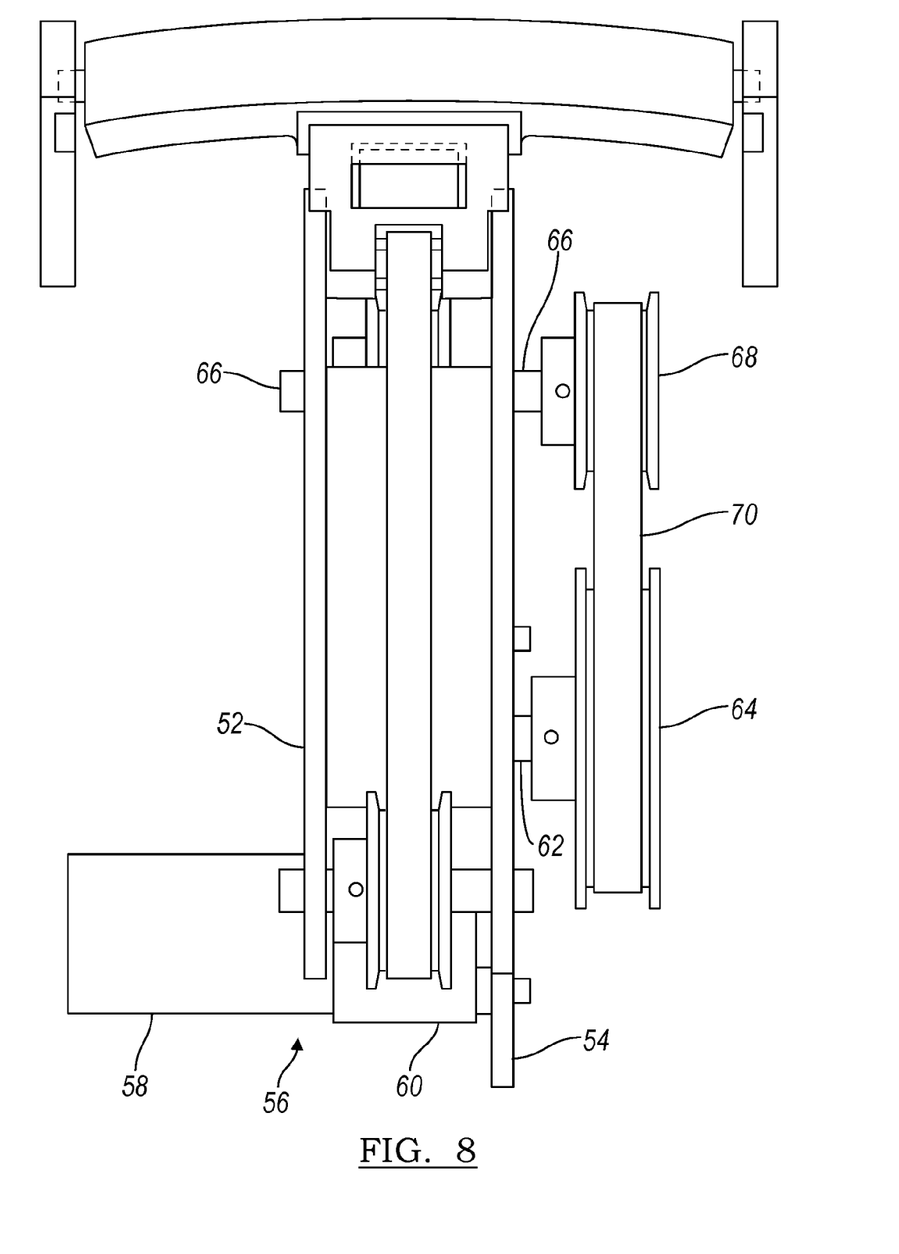
FIG. 8 is an enlarged rear view of the adjustment mechanism of FIG. 3.

Referring to FIG. 8, the adjustment mechanism 20 includes an actuator 56 for providing output torque. The actuator 56 is electrically connected to a vehicle battery (not shown) for receiving electrical energy. The actuator 56 includes a dc motor 58 coupled to a gear train 60, according to the illustrated embodiment. The actuator 56 is mounted to an inner surface of the second plate 54, and an output shaft 62 extends from the actuator 56 and through the second plate 54. A first outer pulley 64 is secured to a distal end of the output shaft 62, and laterally outward of the second plate 54. A drive shaft 66 extends through an upper portion of the plates 52, 54, and is oriented in parallel with the output shaft 62. A second outer pulley 68 is secured to the drive shaft 66. An outer belt 70 is disposed over both outer pulleys 64, 68 for transferring mechanical rotational power to the drive shaft 66. In one or more embodiments, the outer belt 70 and the outer pulleys 64, 68 include teeth (not shown) to prevent belt slip. In other embodiments, the outer pulleys 64, 68 and the outer belt 70 are replaced by two adjacent gears (not shown) or another suitable transmission.

Figure 9:
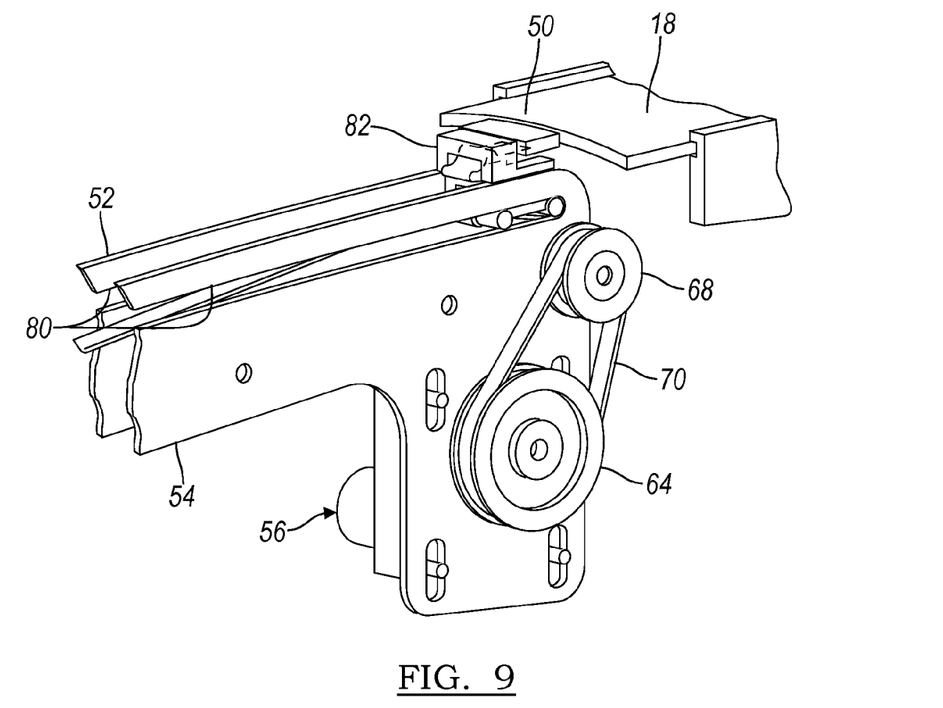
FIG. 9 is an enlarged view of a portion of FIG. 2.
Figure 10:
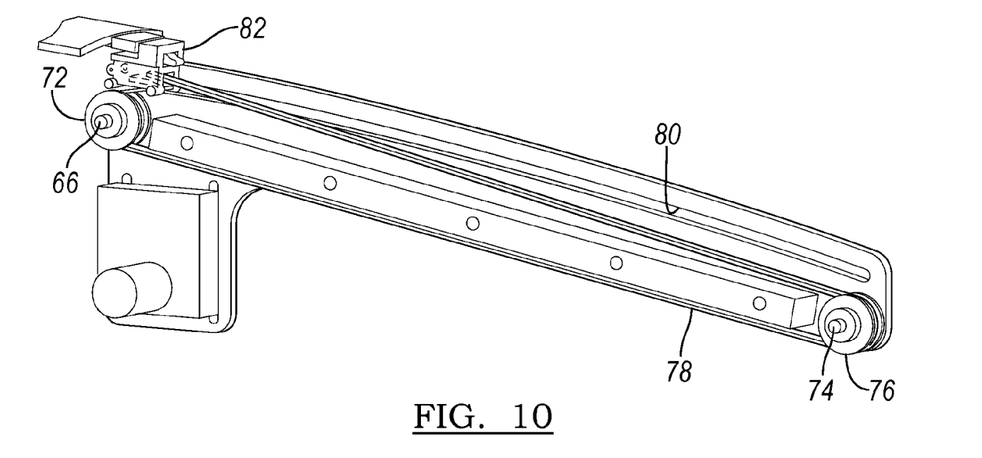
FIG. 10 is a right side perspective view of the adjustment mechanism of FIG. 3, illustrated without a plate and with the panel oriented in the forward position.

With reference to FIGS. 9 and 10 an inner drive pulley 72 is secured to the drive shaft 66 and oriented between the first and second plates 52, 54. A rearward shaft 74 extends through a rearward portion of each plate 52, 54. An inner idler pulley 76 is supported by the rearward shaft 74. An inner belt 78 is disposed over both inner pulleys 72, 76, and driven by the inner drive pulley 72. In one or more embodiments, the inner belt 78 and the inner pulleys 72, 76 include teeth (not shown) to prevent belt slip. An arcuate slot 80 is formed through an upper portion of each plate 52, 54. The adjustment mechanism 20 includes a carriage 82 that is mounted for translation along the arcuate slots 80.

The actuator 56 is coupled to the carriage 82 for controlling translation of the panel 18 between a closed position and an open position (shown in FIG. 4). The carriage 82 is secured to the inner belt 78. The carriage 82 is connected to the proximal end 50 of the panel 18. Thus the actuator 56 is coupled to the carriage 82 and the panel 18, through the outer belt 70 and outer pulleys 64, 68, and the inner belt 78 and inner pulleys 72, 76.

Figure 11:
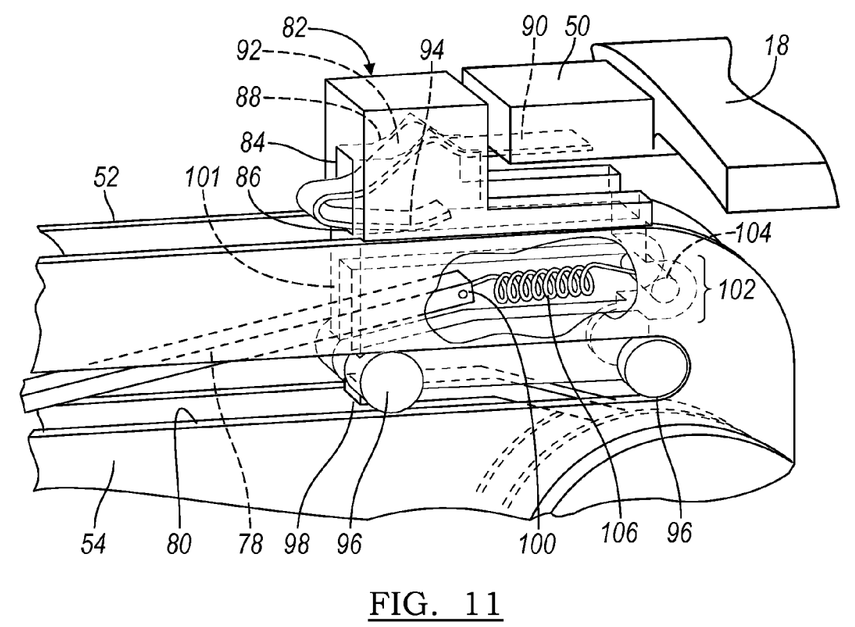
FIG. 11 is an enlarged left side perspective view of a portion of the adjustment mechanism of FIG. 2, illustrating a carriage and a proximal end of the panel.

With reference to FIG. 11, in one embodiment the carriage 82 is releasably connected to the proximal end 50 of the panel 18. An upper pocket 84 is formed longitudinally through an upper portion of the carriage 82. The upper pocket 84 is defined by a generally planar lower surface 86 and an upper surface having a detent 88 formed therein. A leaf spring 90 is secured to the proximal end 50 of the panel 18. The leaf spring 90 extends longitudinally outward from the panel 18 with a curved upper portion 92 and a free end 94 that extends back toward the panel 18. To connect the panel 18 to the carriage 82, the panel 18 and leaf spring 90 are translated toward the carriage 82. The curved upper portion 92 of the leaf spring 90 bends downward as it contacts the upper surface of the upper pocket 84. The free end 94 of the spring reacts against the lower surface 86 of the upper pocket 84 to create an upward spring force. This spring force biases the curved upper portion 92 of the spring 90 upward to engage the detent 88. Similarly, the panel 18 may be detached from the carriage 82 by pulling the panel 18 away with enough force to overcome the spring force. The leaf spring 90 may be selected with a spring constant corresponding to a desired insertion/pull-out force. In other embodiments, the proximal end 50 of the panel 18 may be rigidly attached to the carriage 82 (e.g., with a fastener).

In one or more embodiments, a series of supports 96 extend outward from a lower portion of the carriage 82 and extend through the arcuate slots 80. The supports 96 engage the plates 52, 54 for supporting the carriage 82. The supports 96 are formed of a polymeric material having a low coefficient of friction for reducing a friction force associated with translational movement of the carriage 82. In one embodiment, the supports 96 are integrally formed with the carriage 82. In another embodiment, the carriage and projections are integrally formed of a metal material with polymeric bushings disposed over the projections (not shown).

In the illustrated embodiment, the inner belt 78 is formed as a strip, rather than a continuous loop (e.g., the outer belt loop 70). The inner belt 78 includes a first end 98 and a second end 100. The carriage 82 includes a channel 101 formed into a lower portion of the carriage 82. The first end 98 of the inner belt 78 is secured to a rearward end of the carriage 82 within the channel 101. The second end 100 of the inner belt 78 is secured to a forward end of the carriage 82 within the channel 101. In other embodiments, the inner belt 78 is formed as a loop (not shown) and secured to the carriage 82.

The adjustment mechanism 20 includes a tensioner 102 for maintaining tension within the inner belt 78 throughout the longitudinal travel of the carriage 82. As shown in FIG. 10, the inner belt 78 travels in an irregular shaped path which results in varying belt tension throughout the travel of the carriage 82. Varying belt tension may result in the inner belt 78 slipping relative to the inner pulleys 72, 76 (FIG. 10). The tensioner 102 applies an additional load to the inner belt 78 to limit such belt slip. In the illustrated embodiment, the tensioner 102 includes a pin 104 secured within the channel 101, and an extension spring 106. The extension spring 106 connects the second end 100 of the inner belt 78 to the pin 104. In other embodiments, the second end 100 of the inner belt 78 is secured to the carriage 82, and a spring (not shown) applies a transverse load to the inner belt 78.

Figure 12:
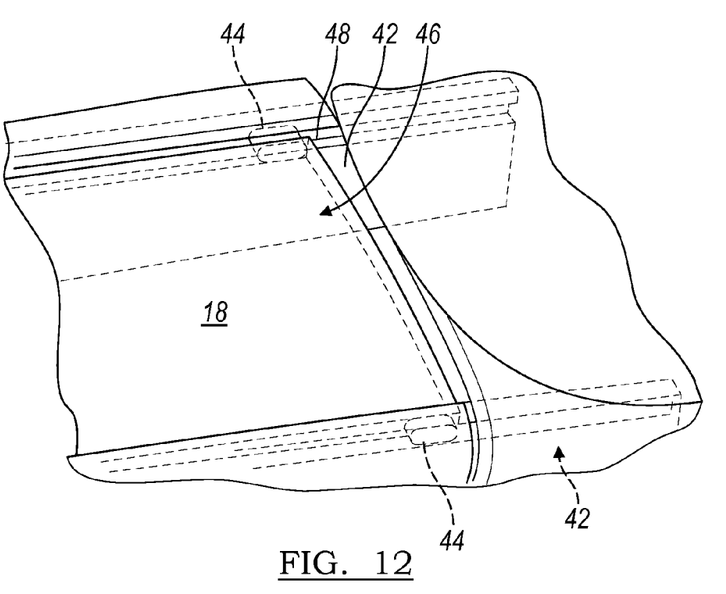
FIG. 12 is an enlarged top perspective view of the center console and the adjustment mechanism of FIG. 1, illustrating a distal end of the panel.

FIG. 12 illustrates an enlarged view of the distal end 46 of the panel 18. The projections 44 extend laterally outward from the panel 18 to engage the groves 48 formed in the panel guides 42. The projections 44 are formed in a generally rectangular shape, according to the illustrated embodiment. This rectangular shape of the projections 44 limits rotation of the panel 18 about the two projections 44, if the proximal end 50 of the panel 18 is disconnected from the adjustment mechanism 20. In other embodiments, the projections are formed in a generally cylindrical shape (not shown).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a vehicle body having a passenger compartment;
   a first seating row oriented in a forward position of the passenger compartment, the first seating row having two front seats, each front seat being laterally spaced apart from each other;
   a second seating row oriented in an intermediate position of the passenger compartment, the second seating row having two rear seats, each rear seat being laterally spaced apart from each other;
   a center console extending longitudinally between the two rear seats and the two front seats, the center console defining a cavity with a receptacle disposed therein;
   an adjustment mechanism disposed within a rearward portion of the center console, the adjustment mechanism including:
      a plate having an arcuate slot formed therein;
      an actuator mounted to the plate;
      a carriage coupled to the actuator and mounted for translation along the arcuate slot;
      at least one belt for coupling the actuator to the carriage; and
      a tensioner connected to the carriage and operatively coupled to the belt for applying tension; and
   a panel disposed over an intermediate portion of the center console, the panel having a proximal end connected to the carriage, and a rearward end supported slidably by the center console, the panel being movable in a fore-and-aft direction between a forward position over the receptacle and a rearward position for providing access to the receptacle.

2. The vehicle of claim 1 wherein the center console further comprises:
   a pair of sidewalls that are laterally spaced apart from each other and extend from the vehicle body; and
   a forward upper surface and a rearward upper surface each extending laterally over the sidewalls and longitudinally spaced apart from each other for providing arm rests for the corresponding seating row;
   wherein the adjustment mechanism is disposed between the rearward upper surface and the vehicle body and the panel is disposed between the adjustment mechanism and the rearward upper surface when oriented in the rearward position.

3. The vehicle of claim 1 further comprising a leaf spring for releasably connecting the proximal end of the panel to the carriage.

4. The vehicle of claim 1 wherein the plate further comprises a pair of plates that are laterally spaced apart from each other, and wherein the adjustment mechanism further comprises:
   at least two outer pulleys coupled to the actuator and connected to each other by a first belt, the outer pulleys being disposed laterally outward of the plates; and
   at least two inner pulleys coupled to the outer pulleys by a common shaft and connected to each other by a second belt.

5. An adjustment mechanism comprising:
   a pair of plates that are laterally spaced apart from each other and disposed within a center console, each plate having an arcuate slot formed therein;
   an actuator mounted to at least one of the pair of plates;
   a carriage coupled to the actuator and mounted for translation along the arcuate slot; and
   a panel having a proximal end connected to the carriage and a distal end supported slidably by the center console, and movable in a fore-and-aft direction for providing access to contents within the center console;
   at least two outer pulleys coupled to the actuator and connected to each other by a belt, the outer pulleys being disposed laterally outward of the plates; and
   at least two inner pulleys coupled to the outer pulleys by a common shaft and connected to each other by a belt strip.

6. The adjustment mechanism of claim 5 wherein the carriage further comprises a channel formed therein, and wherein the belt strip includes a first end and a second end, each end being connected to the carriage within the channel.

7. The adjustment mechanism of claim 5 further comprising:
   a tensioner connected to one of the carriage and the pair of plates and operatively coupled to the belt strip for applying tension.

8. The adjustment mechanism of claim 5 further comprising:
   a leaf spring having a curved portion for engaging a detent formed into the carriage and releasably connecting the panel to the carriage.

9. A center console extending longitudinally between two rear seats and two front seats, the center console defining a cavity with a receptacle disposed therein, the center console comprising:
   the adjustment mechanism of claim 5.

10. An adjustment mechanism comprising:
    a plate having a slot formed therein;
    an actuator mounted to the plate;
    a carriage coupled to the actuator and mounted for translation along the slot; and
    a panel having a proximal end releasably connected to the carriage by a leaf spring and a distal end supported slidably by an upper portion of a center console, and movable in a fore-and-aft direction for providing access to contents within the center console.

11. The adjustment mechanism of claim 10 wherein the carriage includes an upper pocket projecting longitudinally therethrough with a generally planar lower surface and a detent formed into an upper surface, and wherein the adjustment mechanism further comprises:

the leaf spring, wherein the leaf spring extends longitudinally from the proximal end of the panel, the leaf spring having a curved upper portion for engaging the detent and a free end for contacting the lower surface for biasing the upper portion into the detent.

12. The adjustment mechanism of claim 10 further comprising:

at least one belt for coupling the actuator to the carriage; and a tensioner connected to the carriage and operatively coupled to the belt for applying tension.

13. The adjustment mechanism of claim 12 wherein the tensioner further comprises a spring interconnecting a first end of the belt to the carriage.

14. The adjustment mechanism of claim 10 further comprising:

a belt strip for coupling the actuator to the carriage, the belt strip having a first end and a second end each connected to the carriage within a channel.

15. The adjustment mechanism of claim 14 wherein the plate further comprises a pair of plates that are laterally spaced apart from each other; the adjustment mechanism further comprising:

at least two outer pulleys coupled to the actuator and connected to each other by a belt, the outer pulleys being disposed laterally outward of the plates; and at least two inner pulleys coupled to the outer pulleys by a common shaft and connected to each other by the belt strip.

16. An adjustment mechanism comprising:

a plate having a slot formed therein;

a carriage mounted for translation along the slot;

a panel having a proximal end and a distal end supported slidably by an upper portion of a center console, and movable in a fore-and-aft direction for providing access to contents within the center console; and a leaf spring for releasably connecting the proximal end of the panel to the carriage.

* * * * *